United States Patent
El-Zein et al.

(10) Patent No.: US 10,565,338 B2
(45) Date of Patent: Feb. 18, 2020

(54) EQUIVALENCY VERIFICATION FOR HIERARCHICAL REFERENCES

(71) Applicant: International Business Machines Corporation, Armonk, NY (US)

(72) Inventors: Ali S. El-Zein, Austin, TX (US); Mark A. Williams, Pleasant Valley, NY (US); Robert L. Kanzelman, Rochester, MN (US); Viresh Paruthi, Austin, TX (US); Wolfgang Roesner, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 184 days.

(21) Appl. No.: 15/840,064

(22) Filed: Dec. 13, 2017

(65) Prior Publication Data

US 2019/0179974 A1   Jun. 13, 2019

(51) Int. Cl.
*G06F 17/50* (2006.01)
*G01R 31/3183* (2006.01)

(52) U.S. Cl.
CPC ... *G06F 17/505* (2013.01); *G01R 31/318314* (2013.01); *G06F 17/5027* (2013.01); *G06F 17/5072* (2013.01)

(58) Field of Classification Search
USPC .......................................................... 716/102
See application file for complete search history.

(56) References Cited

U.S. PATENT DOCUMENTS

| | | | |
|---|---|---|---|
| 7,111,269 B2 | 9/2006 | Satapathy et al. | |
| 7,162,706 B2 | 1/2007 | Kuang et al. | |
| 7,257,802 B2 | 8/2007 | Daw et al. | |
| 7,509,611 B2 | 3/2009 | Fredrickson et al. | |
| 8,051,402 B2 | 11/2011 | Snell | |
| 8,533,643 B2 | 9/2013 | Guo et al. | |
| 8,782,581 B2 | 7/2014 | Agarwala et al. | |
| 2008/0288901 A1* | 11/2008 | Barowski | G06F 17/504 716/108 |
| 2011/0214096 A1* | 9/2011 | Sheeley | G06F 17/504 716/107 |
| 2011/0307848 A1* | 12/2011 | Yeung | G06F 17/504 716/103 |
| 2013/0144589 A1* | 6/2013 | Levi | G06F 17/5022 703/14 |
| 2014/0215418 A1* | 7/2014 | Brinkmann | G06F 17/504 716/106 |

(Continued)

OTHER PUBLICATIONS

Chang et al., "Parallel Logic Simulation: Myth or Reality?", Avery Design Systems, 0018-9162/12 © 2012 IEEE, Published by the IEEE Computer Society, Apr. 2012, 7 pages.

(Continued)

*Primary Examiner* — Mohammed Alam
(74) *Attorney, Agent, or Firm* — Isaac J. Gooshaw (57) ABSTRACT

Embodiments of the present invention provides methods, computer program products, and a system for processing hierarchical references for a formal equivalence check. In certain embodiments, hierarchical references of a first design are identified as functionally equivalent to hierarchical references of a second design. Value outputs of the first design can be compared to the value outputs of the second design to determine whether the value outputs of the respective designs match.

17 Claims, 5 Drawing Sheets

(56) References Cited

U.S. PATENT DOCUMENTS

2015/0242556 A1* 8/2015 Raghavan ............... G06F 17/50
716/111

OTHER PUBLICATIONS

Schubert et al., "Solutions to IBM POWER8 verification challenges", Digital Object Identifier: 10.1147/JRD.2014.2380271,0018-8646/15 © 2015 IBM, IBM J. RES. & DEV. vol. 59 No. 1 Paper 11 Jan./Feb. 2015, 17 pages.

* cited by examiner

FIG. 5

EQUIVALENCY VERIFICATION FOR HIERARCHICAL REFERENCES

BACKGROUND

The present invention relates generally to the field of microprocessors, and more particularly to the verification of integrated circuit designs.

Computational hardware designs are hierarchical in nature where modules within the hierarchy encapsulate a variety of logic functionality as a node. Logic designers and verification engineers tend to group together logical blocks that are functionally related into a functional (or logical) hierarchy for a circuit design. A functional hierarchy can then be transformed into a physical hierarchy that physically implements the functional hierarchy through integrated circuit components. For example, a functional hierarchy that calls for an "exclusive or" (XOR) gate can be transformed into a physical hierarchy containing a transistor circuit that physically produces a XOR result.

As a design for an integrated circuit evolves, formal equivalence checking is used to ensure that, while the internal structure of a design may change, the overall inputs and outputs of a functional hierarchy and physical hierarchy of a changed design remain unchanged (i.e., equivalent). Contrasting to equivalence checking, functional verification is the task of checking that a logical hierarchy conforms to what was intended. This may include functional verifications to any design changes to the logical hierarchy to ensure that, while the logical hierarchy may have changed, the outcome of the design change produces what was intended. Equivalence checking should not be confused with functional verification since equivalence checking confirms that both the functional hierarchy and the physical hierarchy both agree on an output for any randomly chosen input.

Logic synthesis is a process that converts a physical hierarchical high-level design, i.e., a hardware description language (HDL), such as a Very High Speed Integrated Circuit Hardware Description Language (VHSIC HDL, or more commonly known as VHDL) or Verilog, into a gate-level netlist. A netlist is a description of the connectivity of an electronic circuit, which can be comprised of a list of components in a circuit and a list of nodes they are connected to. A "gate-level" netlist is a design implementation description in terms of logic gates and interconnects, thus the gate-level netlist would comprise of a list of logic gates and a list of connections made between the logic gates. A synthesis tool is a computer program that performs logic synthesis in providing a gate-level netlist. Additionally, the gate-level netlist can be optimized for a variety of constraints while preserving the physical hierarchical high-level design. Such as optimizations for the gate-level netlist can accommodate for area, timing, and power constraints. These optimizations are verified to be correct by formal equivalence checking tools, which ensure the logic function, before and after the transformations/changes, are exactly the same. There are also a few optimizations that need to be verified by functional verification methods, which are often times unrelated to the core function of the logic, such as design-for-test logic (e.g., scan). In these cases, optimizations are back annotated into the logical hierarchical VHDL.

"Hierarchical references" are used to reflect the changes back to the logical VHDL without the need to rewrite and restructure substantial portions of the logic. Hierarchical references are a construct which allows making connections across design hierarchies which would otherwise not be feasible via port maps without reorganizing/rewiring the design, and adding or deleting components. A hierarchical reference denotes an object declared in a design hierarchy, and contains a path to the object being accessed. Individual elements in the path are separated by a dot (i.e., "."). For example, a node in a functional hierarchy contains two hierarchical references named "rlm0.a" and "rlm0.b". Another node in the functional hierarchy also has hierarchical references named "rlm1.c" and "rlm1.d". The hierarchical references of the two macros can then be connected as such where rlm0.a feeds to rlm1.c (i.e., rlm1.c<=rlm0.a), and rlm1.c feeds to rlm0.b (i.e., rlm0.b<=rlm1.c). A hierarchy manipulation tool (e.g., Atrenta GenSys RTL) creates a physical hierarchy from a logical hierarchy, and can process hierarchical references and insert them at different levels of the logical hierarchy, to which the latter is transformed into a physical hierarchy.

"Blackboxing" lower level components enable a scalable hierarchical method to verify equivalence of design transformations, and is a common practice in functional and physical hierarchical design. Blackboxing is an abstraction which entails removing logic associated with a certain component or block, and replacing it with a shell having the same interface (input and output ports/pins). In a functional verification context, the outputs of the blackboxed component that serve as inputs for later logic are driven randomly, hence creating an over-approximation of prior logic in the logic sequence, which can then be used to prove correctness.

In an equivalence checking context, interface ports of blackboxed components across the two designs being equivalence checked are corresponded (i.e., if applicable, inputs to both blackboxes in a functional hierarchy and in a physical hierarchy are the same; and similarly, if applicable, outputs from both blackboxes in the functional hierarchy and in the physical hierarchy are the same). The input ports of the blackboxes can then be used to check for equivalence (i.e. miter'ed): randomly driving the output for both blackboxes generates the same input for both blackboxes. By virtue of this, the check ensures the values presented at the inputs of the corresponding blackboxes components are the same under all possible valuations of randomly driven inputs, making the overall equivalence check complete—in conjunction with other compare points such as design outputs, and correlating design inputs that are randomly driven.

SUMMARY

Embodiments of the present invention disclose a method, a computer program product, and a system for processing hierarchical references for a formal equivalence check. In one embodiment of the present invention, a method is provided comprising: identifying hierarchical references of a first design that are functionally equivalent to hierarchical references of a second design; constructing a netlist of the identified hierarchical references of the first design that are functionally equivalent to the hierarchical references of the second design; connecting targets of the first design and the second design to measure value outputs of both the first and the second design; and determining whether the measured value outputs of the first design match the value outputs of the second design.

DETAILED DESCRIPTION

Embodiments of the present invention recognize that design changes to a physical or functional hierarchy require an equivalence checking process to ensure any transformations to the design had no effect on an overall output of the design; however, formal equivalence checking can quickly become intractable given the exponential complexity of typical designs. In some cases, a physical hierarchy representing a functional hierarchy may face spatial limitations due to area or routing constraints, so a logic designer may consider alternative physical forms of a logical block to produce the same function. The correctness of the transformations going from a functional hierarchy to a physical hierarchy is typically verified using formal equivalence checking tools, which ensure the design function are the same before and after the moves of different logic blocks. Hierarchical references can reach into lower levels of both function and physical hierarchies, thus all the lower level components need to be present (i.e., cannot be blackboxed) when running equivalency checking between the physical and logical hierarchies. This can have a profound effect on performance, and, in some cases, makes it impossible to verify equivalence—especially if the hierarchical references are placed at higher levels of the hierarchy while reaching deep into lower levels of the hierarchy.

In designing integrated circuitry, functional (or logical) hierarchies may not map well to a two-dimensional layout solution since the hierarchy is typically conceived with little consideration of the layout, which can be subject to area and routing constraints. Logic designers are forced to map logic to an alternative physical hierarchy where things are grouped according to geographic proximity. Strict enforcement of a single functional/physical hierarchy makes logic design and verification less efficient because placement of logically adjacent blocks along physical design requirements tends to scatter the logic into separated areas of the functional hierarchy. Furthermore, logic designers, as owners of the hardware description language (HDL), are under constant pressure to modify their HDL due to physical constraints. As a possible solution, tools were developed to automatically derive the physical hierarchy from the logical hierarchy. In this process, logic blocks that are treated as "atomic" (i.e., the logic underneath is not perturbed) are "blackboxed" by the transformation process. This transformation allows an equivalence checking process to verify the connections between logic blocks for both the functional hierarchy and the physical hierarchy.

Hierarchical references provide the capability to reach deeper into the logic, possibly referencing signals in components which otherwise would have been blackboxed for the purposes of the equivalence check to verify the transformations. To make equivalence checking easier, a possible solution would be to leave the hierarchical references as is, that is, to not blackbox the components that have hierarchical references. However, this approach is unscalable given the typical complexity of logic blocks, and the fact that the transformation specifically relies on not modifying function logic encapsulated in the blocks, instead we can move logic blocks around and change logic block interconnects.

Embodiments of the present invention recognize the deficiencies in the field of microprocessors. As integrated circuits become more complex, integrated circuit designing systems cannot currently process complex hierarchical references in a reliable, efficient manner. Specifically, embodiments of the present invention recognize that systems designed for the purposes of designing microprocessors currently lack a scalable way to perform equivalence checks. Embodiments of the present invention provide solutions for formal equivalence checking and provides the option of blackboxing components referenced by hierarchical references. In this manner, embodiments of the present invention provide the capability of performing equivalence checks in a scalable way that was not previously possible by current systems. By improving the efficiency and accuracy of equivalence checking systems, the overall design of microprocessors can be improved.

Furthermore, the embodiments of the present invention provide the capability to reduce run times for computer simulation and testing for integrated circuit designs, subsequently reducing the necessary computational resources (e.g., power consumption, run-times, allocated memory, etc.) in the design and production of integrated circuitry. Implementation of embodiments of the invention may take a variety of forms, and exemplary implementation details are discussed subsequently with reference to the figures.

Figure 1:
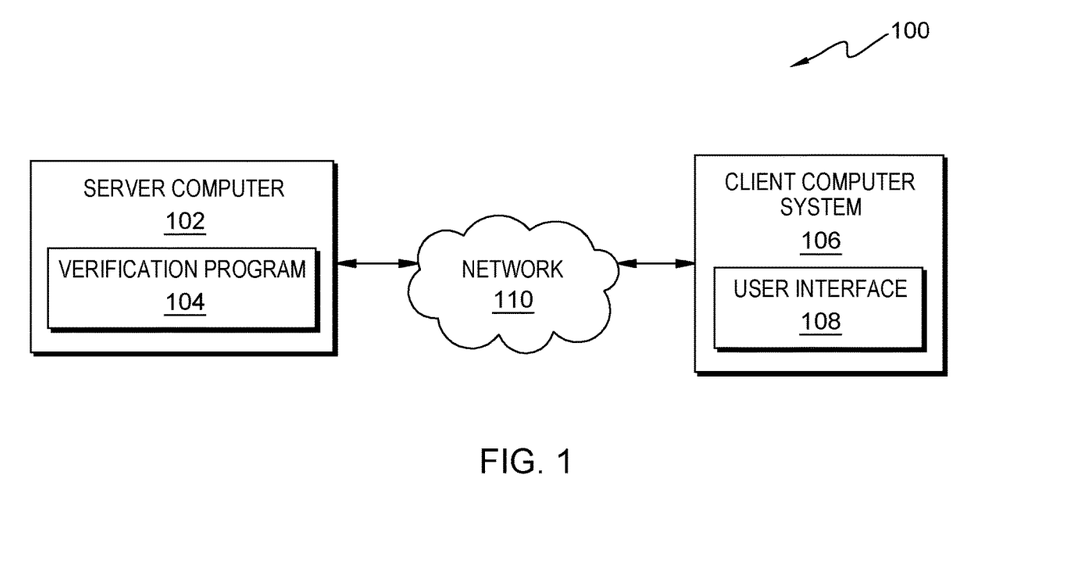
FIG. 1 is a functional block diagram illustrating a verification environment, in accordance with an embodiment of the present invention.

FIG. 1 is a functional block diagram illustrating a verification environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Verification environment 100 includes server computer 102 and client computer system 106, all interconnected over network 110. Server computer 102 and client computer system 106 can each be a standalone computing device, a management server, a web server, a mobile computing device, or any other electronic device or computing system capable of receiving, sending, and processing data. In other embodiments, server computer 102 and client computer system 106 can each represent a server computing system utilizing multiple computers as a server system, such as in a cloud computing environment. In another embodiment, server computer 102 and client computer system 106 can each be a laptop computer, a tablet computer, a netbook computer, a personal computer (PC), a desktop computer, a personal digital assistant (PDA), a smart phone, or any programmable electronic device capable of communicating with various components and other computing devices (not shown) within verification environment 100 via network 110. In another embodiment, server computer 102 and client computer system 106 each represent a computing system utilizing clustered computers and components (e.g., database server computers, application server computers, etc.) that act as a single pool of seamless resources when accessed within verification environment 100. In some embodiments, server computer 102 and client computer system 106 are a single device. Server computer 102 and client computer system 106 may include internal and external hardware components capable of executing machine-readable program instructions, as depicted and described in further detail with respect to FIG. 5.

Server computer 102 includes verification program 104. In general, verification program 104 is a program capable of utilizing hierarchical references in both the functional and physical hierarchies for equivalence checking with the option of blackboxing components that are referenced by hierarchical references for at least a first and a second design. In this embodiment, verification program 104 maps the sources and sinks of the hierarchical references, constructs a netlist of hierarchical references, and connects targets of the first and the second design to measure value outputs of both the first and the second design. Verification program 104 can then determine whether the measured value outputs of the first design match the value outputs of the second design. In this embodiment, verification program 104 connects targets of the first and the second design by converting common sinks of hierarchical references of the first design that are functionally equivalent to the hierarchical references of the second design in order to perform an equivalence check. As used herein, a netlist is a description of the connectivity of an electronic circuit, wherein the description comprises of a list of components in a circuit and a list of nodes the components are connected with. As used herein, a source is a node of a network of components, wherein the components are connected to a common input. As used herein, a sink is a node of a network of components, wherein the components are connected to a common output. As used herein, functional hierarchy is used interchangeably with logical hierarchy. As used herein a functional (or logical) hierarchy is an abstract description in a form of a hierarchy that describes the logic operations of a circuit. A physical hierarchy is a hierarchy that physically manifests a functional hierarchy by displaying a physical geometry of a circuit (e.g., components, devices, and interconnects), which physically performs what is represented by a functional hierarchy. As used herein, "values" is used interchangeably with "signals" such that "driven random values" can also be interpreted as "driven random signals". Verification program 104 is depicted and described in further detail with respect to FIG. 2.

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications among server computer 102, client computer system 106, and other computing devices (not shown) within verification environment 100.

Client computer system 106 includes user interface 108, wherein user interface 108 allows a user to interact with server computer 102, and subsequently allows a user to interact with verification program 104. In general, user interface 108 can be implemented using a browser and web portal or any program that transmits queries to, and receives results from, server computer 102. For example, user interface 108 can be used to load a microprocessor design for and transmit instructions to verification program 104 to perform an equivalence check on the microprocessor design.

For illustrative purposes, the following discussion is made with respect to verification program 104 hosted on server computer 102 and user interface 108 as a part of client computer system 106. However, it should be understood that verification program 104 and user interface 108 can be on a single device, a combination of devices, and/or on one or more other components of verification environment 100.

Figure 2:
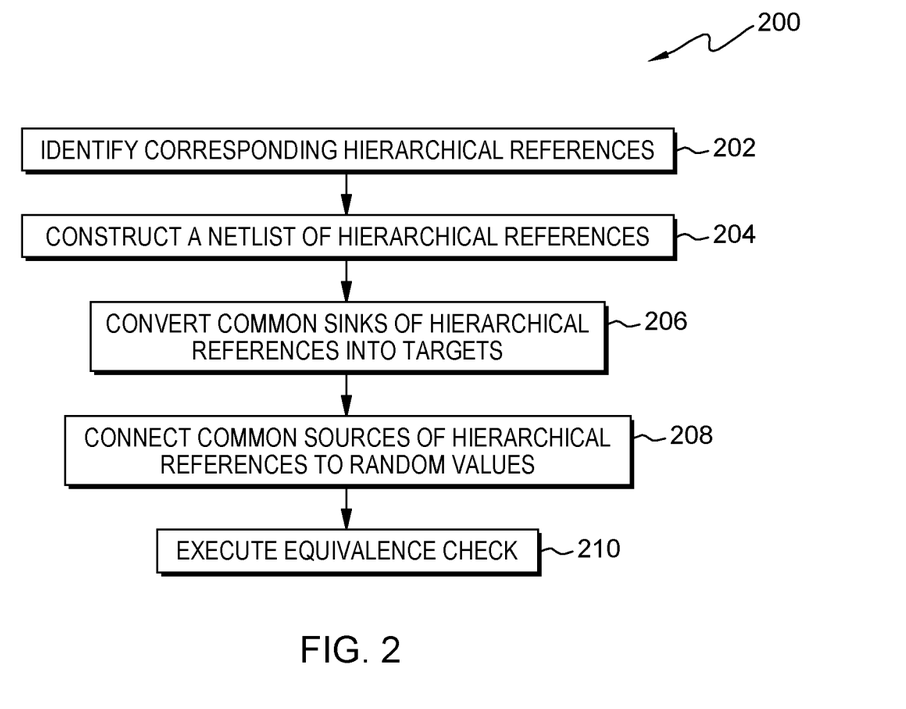
FIG. 2 is a flowchart depicting operational steps of a verification program utilizing hierarchical references in performing equivalence checking for functional and physical hierarchies, in accordance with an embodiment of the present invention.

FIG. 2 is a flowchart 200 depicting operational steps of a verification program utilizing hierarchical references in performing equivalence checking for functional and physical hierarchies, in accordance with an embodiment of the present invention.

In step 202, verification program 104 identifies corresponding hierarchical references between a hierarchy of a first design and a hierarchy of a second design. In this embodiment, verification program 104 identifies corresponding hierarchical references between a hierarchy of a first design and a hierarchy of a second design by matching sources and sinks that are connected to the hierarchical references between the two hierarchies based, at least in part, on a "Name Mapping Database". As used herein, an "original design" is used interchangeably with a "first design". As used herein, a "new design" is used interchangeably with a "second design". A name mapping database is an artifact created by a hierarchy manipulation tool (e.g., GenSys RTL) that tracks hierarchy changes for both the functional hierarchy and the physical hierarchy by tracking component changes and their respective connections. For example, a logic designer arranges four macros (rlm0, rlm1, rlm2, and rlm3) in a particular order in a functional hierarchy, as demonstrated by FIG. 3. The functional hierarchy is implemented by a first design in a physical hierarchy, wherein macros rlm0 and rlm2 are grouped together as a larger block named "lwrap0". Furthermore, the hierarchical references of the first design in the physical hierarchy are connected in a way such that "rlm1.c<=force lwrap0.rlm0.a", "lwrap0.rlm0.b<=force rlm1.c", and "rlm1.d<=force lwrap0.rlm0.b". Using the example hierarchical reference "lwrap0.rlm0.a", the prefix "lwrap0" is attached to the "rlm0" macro to designate that the macro is located inside the lwrap0 block, and the suffix "a" of the rlm0 macro (e.g., rlm0.a) designates that the hierarchical reference is located within the rlm0 macro. Thus, the location of a hierarchical reference described by "lwrap0.rlm0.a" can be read as: hierarchical reference "a" is located within block "rlm0", wherein block "rlm0" is located within block "lwrap0".

In continuing the example demonstrated by FIG. 3, the logic designer later discovers that the arrangement of the first design for the physical hierarchy is unacceptable due to geometric constraints, and proceeds to adjust physical hierarchy into a second design. As the logic designer changes the design using the hierarchy manipulation tool, the tool subsequently creates a name mapping database that records how components are changed or moved to a new location in the hierarchy. The logic designer completes a second design for the physical hierarchy, wherein the second design is arranged such that macros rlm0 and rlm1 are regrouped into a larger block named "lbs0", and macros rlm2 and rlm3 are regrouped into a larger block named "lbs1". The hierarchy manipulation tool records onto the name mapping database the location changes of logic blocks such that 1) lwrap0 is dissolved, 2) that blocks lbs0 and lbs1 are created, 3) that rlm1 is moved inside the lbs0 block, 4) that a new block is created and named lbs1, 5) that rlm3 is moved into the lbs1 block, and 6) that rlm2 is moved out of the lbs0 block (previously named lwrap0) and moved into the lbs1 block. The logic designer then executes verification program 104 to perform an equivalence check for the second design against the first design. Verification program 104 acquires the name mapping database and identifies that the hierarchical references lwrap0.rlm0.a and lwrap0.rlm0.b were moved along with the rlm0 block into the lbs0 block, thus identifying that the hierarchical reference lwrap0.rlm0.a and lwrap0.rlm0.b of the first design corresponds to the hierarchical references within the rlm1 block which was moved into lbs0 block of the second design. Furthermore, verification program 104 identifies that the hierarchical references rlm1.c and rlm1.d were moved along with the rlm1 block into the lbs0 block, thus identifying corresponding hierarchical references of the first and second designs.

In another embodiment, verification program 104 can access a name mapping database, wherein access can be verification program 104 receiving the name mapping database, or verification program 104 being given permission to access the name mapping database located on devices not listed in verification environment 100.

In step 204, verification program 104 constructs a netlist of hierarchical references. In this embodiment, verification program 104 constructs a netlist of hierarchical references by expanding the logic feeding into common sinks between the two designs. This process may or may not traverse different hierarchies. In continuing from the previous example demonstrated by FIG. 3, verification program 104 constructs a netlist by identifying that the hierarchical reference rlm1.d has an input that serves as a common sink between the first and second designs, and constructs a netlist by expanding the logic preceding the hierarchical reference rlm1.d for each of the two designs. For the first design, verification program 104 constructs a netlist based upon connections between the hierarchical references of the first design such that the connections are "rlm1.c<=force lwrap0.rlm0.a", "lwrap0.rlm0.b<=force rlm1.c", and "rlm1.d<=force lwrap0.rlm0.b", which traverses in and out of the lwrap0 hierarchy. For the second design, verification program 104 constructs a netlist based upon the new locations of the hierarchical references recorded by the name mapping database such that, within the lbs0 block, the connections are "rlm1.c<=rlm0.a", "rlm0.b<=rlm1.c", and "rlm1.d<=rlm0.b".

In step 206, verification program 104 converts common sinks of hierarchical references into targets for an equivalence check. In this embodiment, verification program 104 converts common sinks into targets for an equivalence check by identifying common sinks between the netlists of the first and second designs, and assigning the common sinks as targets to be used for an equivalence check. In continuing the example demonstrated in FIG. 3, verification program 104 converts the inputs to the hierarchical reference rlm1.d into a target for an equivalence check since the inputs for rlm1.d across both designs serves as a common sink.

By this process, subsequent logic ahead of the common sink is blackboxed since only the input signals to the blackbox is in the interest of being equivalent. In continuing the example demonstrated in FIG. 3, since the common sink are the signals from force lwrap.0.rlm0.b and rlm0.b which serve as an input for rlm1.d, then logic beyond rlm1.d is disregarded (i.e., blackboxed) since only the signals being received by rlm0.d are in interest of being equivalent.

In step 208, verification program 104 connects common sources of hierarchical references to random values. In this embodiment, verification program 104 connects common sinks to random values by identifying hierarchical references that have a common source, then connecting the common source to random values, wherein the random values are arbitrary values that are within a domain of the designs such that succeeding logic blocks can process the random values into values measurable at the targets. In continuing the example demonstrated in FIG. 3, verification program 104 identifies that the outputs of the hierarchical references lwrap0.rlm0.a and rlm0.a are the same such that outputs act as a common source for rlm1.c for both of the designs. Since the outputs of lwrap0.rlm0.a and rlm0.a are equivalent, verification program 104 connects the outputs of lwrap0.rlm0.a and rlm0.a to random values such that rlm1.c across both designs receive the same random values.

By this process, prior logic behind of the common source is blackboxed since only the output signals originating from the blackbox is in the interest of being equivalent. For example, since the common source are the signals from force lwrap.0.rlm0.a and rlm0.a which serve as an input for rlm1.c for both designs, then logic behind lwrap.0.rlm0.a and rlm0.a are disregarded (i.e., blackboxed) since only the signals being received by rlm1.c for both designs are in interest of being equivalent.

In step 210, verification program 104 executes an equivalence check. In this embodiment, verification program 104 executes an equivalence check by comparing the measured values of the targets of the two designs (where signals at the targets are leading into a first blackbox) while common sources (where signals are leaving a second blackbox) are driven with random values. For example, verification program 104 drives a signal leaving force lwrap.0.rlm0.a and rlm0.a (a common source), and checks that the signals being received by rlm1.d across both designs (a common sink/target) are equivalent. Verification program 104 continues to drive the common sources using all possible random values while checking that the values at the target are equivalent.

In instances where the equivalence check passes (i.e., values measured at targets are similar for both designs for all random values driven at the common sources), then verification program 104 ends since a confirmed equivalence signifies that the design change from the first design to the second design still produces an equivalent result. In a further embodiment, in instances where the equivalence check does not pass (i.e., values measured at targets are dissimilar for both designs for at least one random value driven at the common sources), verification program 104 generates a trace by listing values measured at targets for a corresponding random value driven at a common source of the two designs being equivalence checked. Verification program 104 then displays the trace for a user which show the dissimilar values at the targets for a given random value at the common source.

Accordingly, by performing the operational steps of flowchart 200, embodiments of the present invention can provide a method for formal equivalence checking and provides the option of blackboxing components referenced by hierarchical references. In this manner, embodiments of the present invention provide the capability of performing equivalence checks in a scalable way that was not previously possible by current systems.

Figure 3:
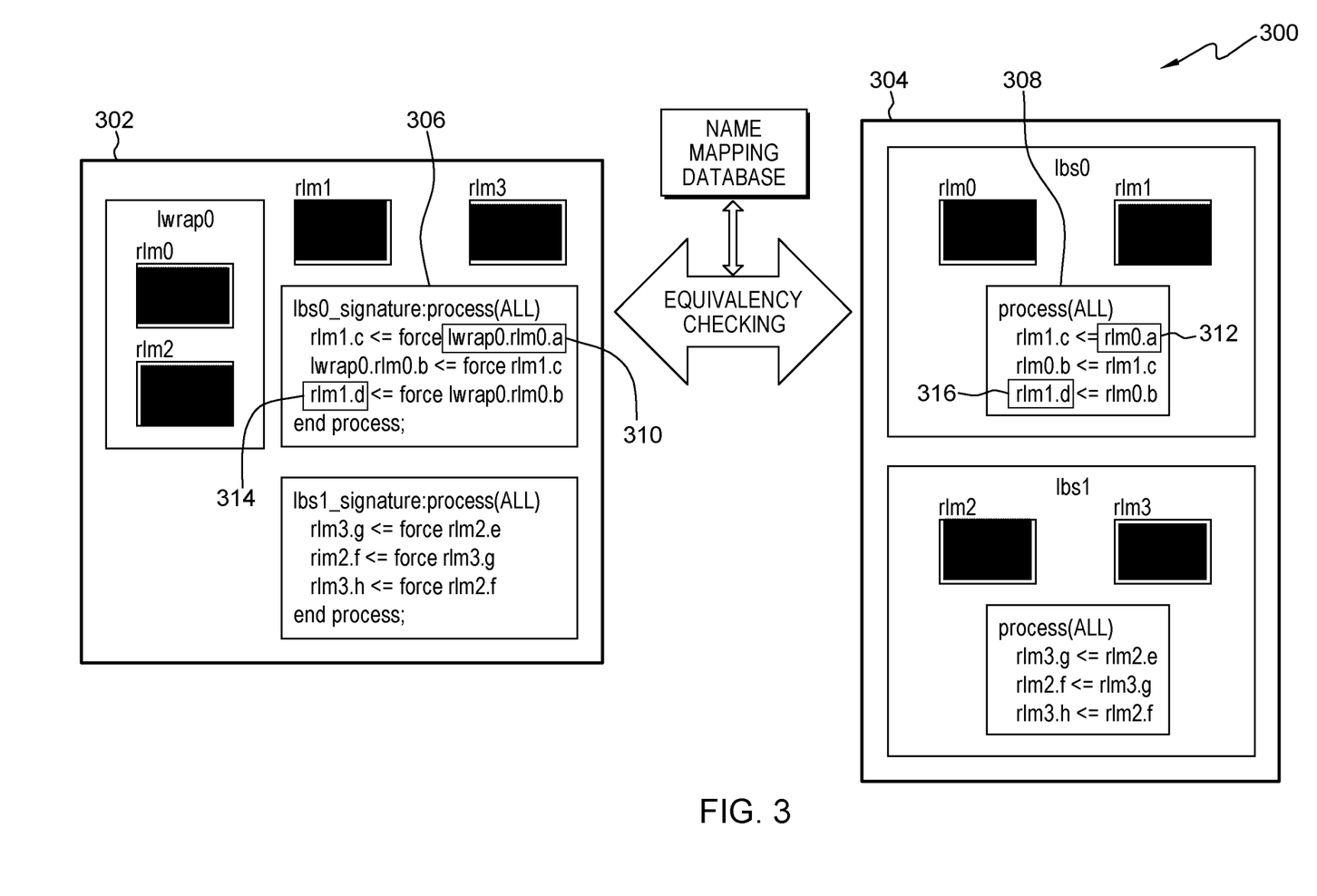
FIG. 3 is an example showing two designs with different physical hierarchies that is to be tested for equivalence by an embodiment of the present invention.

FIG. 3 is an example demonstrating a design change in a physical hierarchy that is to be tested for equivalence, in accordance with an embodiment of the present invention.

In this example, two different physical hierarchy designs have been arranged and are to be tested for equivalency. In the demonstrated example, four small macros (rlm0, rlm1, rlm2, and rlm3) are grouped in a certain way in a functional hierarchy (not shown). In view of the physical hierarchy of the design, macros rlm0 and rlm2 are originally grouped together into a block (lwrap0). The design for the physical hierarchy is then changed to a second design such that the macros are regrouped to form two larger blocks (lbs0 and lbs1). Consider the case where certain optimizations (such as scan chain reconnection) done in the physical hierarchy are back annotated to the logical hierarchy. In this example, we have only assignments. The same method will hold if there is a logic or other component instantiations.

Figure 4:
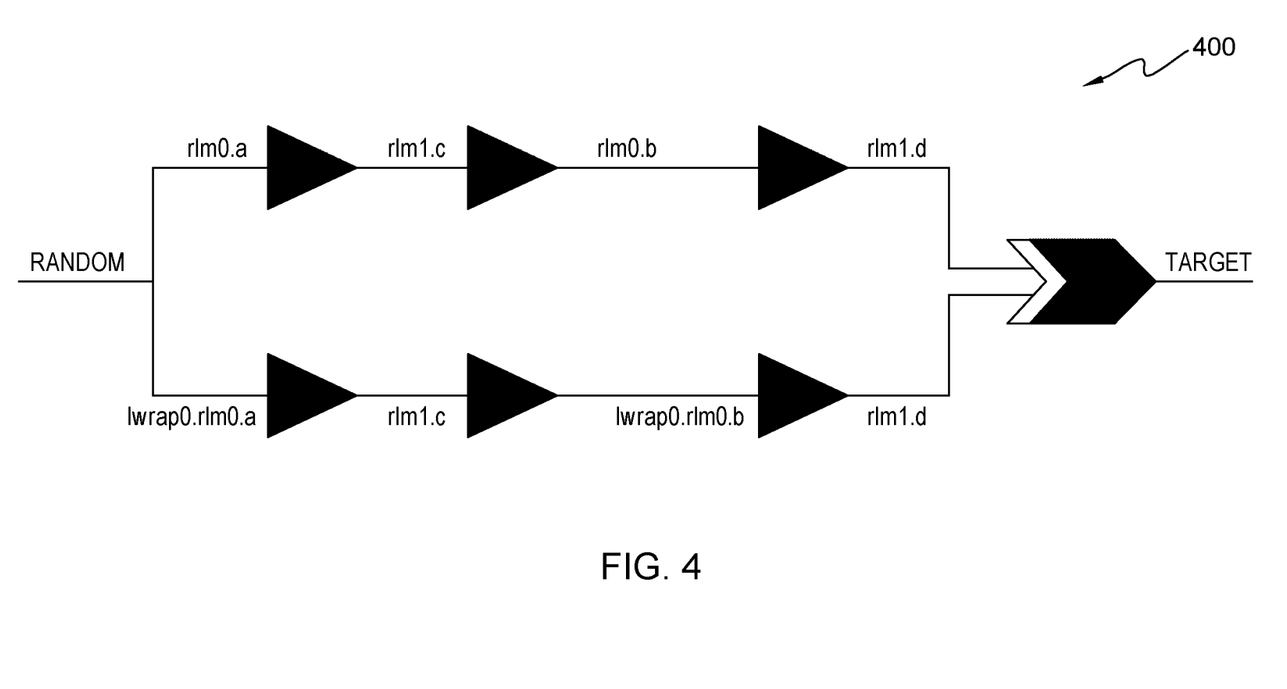
FIG. 4 is a miter network derived by an embodiment of the present invention that tests a new design against an original design for equivalency in the physical hierarchy.

In this example, design 302 and design 304 are both a high-level view of a physical design for a physical hierarchy. Design 302 is a first design, and design 304 is a second and alternative design to be tested for equivalency. Connections 306 and connections 308 are the hierarchical reference connections which detail the connections between hierarchical references that correspond to design 302 and design 304 respectively. Hierarchical reference 310 and hierarchical reference 312 are hierarchical references that have no sources, and furthermore have outputs that are tied and driven by a random value that is the same. Hierarchical reference 314 and hierarchical reference 316 are hierarchical references that have no sinks, and furthermore have outputs that are used as targets for an equivalency check FIG. 4 is miter network 400 derived by an embodiment of the present invention that tests a new design against an original design for equivalency in the physical hierarchy.

In this example, verification program 104 has generated a netlist describing the connections between the hierarchical references of the two designs detailed in FIG. 3. The connections listed by the netlist are combined graphically, for interpretive ease for the reader, into a miter network as shown in FIG. 4. In the demonstrated example, miter network 400 is constructed according to the operational steps of verification program 104. In this example, verification program 104 constructs connections 306 and connections 308 into miter network 400 such that the inputs for both the original design (design 302) and the new design (design 304) are supplied with the same inputs, and the outputs are checked for equivalence. For example, design 302 calls for the output of lwrap0.rlm.a to be an input to rlm1.c (i.e. "rlm1.c<=force lwrap0.rlm0.a"), the output of rlm1.c is the input for lwrap0.rlm0.b, and the output of lwrap0.rlm0.b is the input for rlm1.d. Furthermore, design 304 calls for the output of rlm0.a to be an input to rlm1.c, the output of rlm1.c is the input for rlm0.b, and the output of rlmb0.b is the input for rlm1.d. Lastly, verification program 104 connects rlm0.a and lwrap0.rlm0.a to receive the same input, which is randomly generated, and makes the outputs of rlm1.d across both designs the targets of an equivalence check. Miter networks, such as the miter network inferred from the hierarchical references of FIG. 4, are in addition to the proof obligations from the rest of the process which remains the same. Once completed the process ensures the reconnections as affected by the hierarchical references are indeed functionally equivalent.

Figure 5:
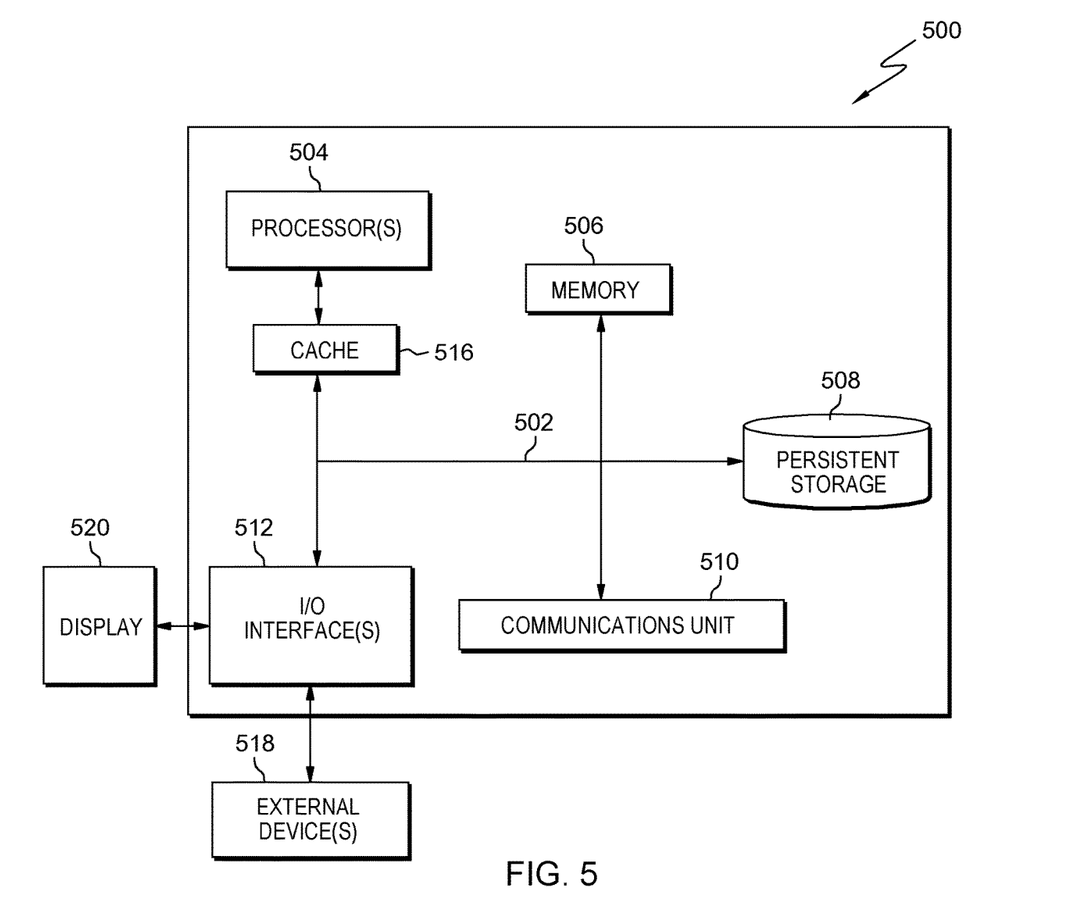
FIG. 5 depicts a block diagram of components of the computing systems of FIG. 1, in accordance with an embodiment of the present invention.

FIG. 5 depicts a block diagram of components of computing systems within verification environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Verification program 104 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Verification program 104 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., Verification program 104, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying hierarchical references of a first design that are functionally equivalent to hierarchical references of a second design;
constructing a netlist of the identified hierarchical references of the first design that are functionally equivalent to the hierarchical references of the second design;
connecting targets of the first design and the second design to measure value outputs of both the first and the second design by:
converting common sinks of the identified hierarchical references of the first design that are functionally equivalent to the hierarchical references of the second design into targets for an equivalence check; and
connecting common sources of the identified hierarchical references to random values within a domain of the first and second designs; and
determining whether the measured value outputs of the first design match the value outputs of the second design.

2. The computer-implemented method of claim 1, wherein determining whether the measured value outputs of the first design match the value outputs of the second design comprises:
executing an equivalence check, wherein the equivalence check compares the values at the targets of the first and second design while the common sources are connected to random values.

3. The computer-implemented method of claim 1, wherein identifying hierarchical references of the first design that are functionally equivalent to hierarchical references of the second design is based at least in part on saved changes on a name mapping database.

4. The computer-implemented method of claim 1, wherein constructing a netlist of the identified hierarchical references of the first design that are functionally equivalent to the hierarchical references of the second design comprises:
identifying common sources and common sinks of the first design and the second design; and
identifying hierarchical references of the common sink and expanding logic feeding into common sinks for each of the first and the second design.

5. The computer-implemented method of claim 1, further comprising:
generating a trace based on the executed equivalence check, wherein the trace lists values measured at the targets for a corresponding random value driven at a common source.

6. The computer-implemented method of claim 5, further comprising:
displaying the trace for a user on an interactive user interface; and
identifying, for a user, dissimilar values that need to be resolved.

7. A computer program product comprising:
one or more computer readable storage media and program instructions stored on the one or more computer readable storage media, the program instructions comprising:
program instructions to identify hierarchical references of a first design that are functionally equivalent to hierarchical references of a second design;
program instructions to construct a netlist of the identified hierarchical references of the first design that are functionally equivalent to the hierarchical references of the second design;
program instructions to connect targets of the first design and the second design to measure value outputs of both the first and the second design, wherein the program instructions to connect targets of the first design and the second design to measure value outputs of both the first and the second design comprise:
program instructions to convert common sinks of the identified hierarchical references of the first design that are functionally equivalent to the hierarchical references of the second design into targets for an equivalence check; and
program instructions to connect common sources of the identified hierarchical references to random values within a domain of the first and second designs; and
program instructions to determine whether the measured value outputs of the first design match the value outputs of the second design.

8. The computer program product of claim 7, wherein the program instructions to determine whether the measured value outputs of the first design match the value outputs of the second design comprise:
program instructions to execute an equivalence check, wherein the equivalence check compares the values at the targets of the first and second design while the common sources are connected to random values.

9. The computer program product of claim 7, wherein the program instructions to identify hierarchical references of the first design that are functionally equivalent to hierarchical references of the second design is based at least in part on saved changes on a name mapping database.

10. The computer program product of claim 7, wherein the program instructions to construct a netlist of the identified hierarchical references of the first design that are functionally equivalent to the hierarchical references of the second design comprise:
program instructions to identify common sources and common sinks of the first design and the second design; and
program instructions to identify hierarchical references of the common sink and expanding logic feeding into common sinks for each of the first and the second design.

11. The computer program product of claim 7, wherein the program instructions stored on the one or more computer readable storage media further comprise:
program instructions to generate a trace based on the executed equivalence check, wherein the trace lists values measured at the targets for a corresponding random value driven at a common source.

12. The computer program product of claim 11, wherein the program instructions stored on the one or more computer readable storage media further comprise:
program instructions to display the trace for a user on an interactive user interface; and
identifying, for a user, dissimilar values that need to be resolved.

13. A computer system comprising:
one or more computer processors;
one or more computer readable storage media; and program instructions stored on the one or more computer readable storage media for execution by at least one of the one or more processors, the program instructions comprising:

program instructions to identify hierarchical references of a first design that are functionally equivalent to hierarchical references of a second design;

program instructions to construct a netlist of the identified hierarchical references of the first design that are functionally equivalent to the hierarchical references of the second design;

program instructions to connect targets of the first design and the second design to measure value outputs of both the first and the second design, wherein the program instructions to connect targets of the first design and the second design to measure value outputs of both the first and the second design comprise:

program instructions to convert common sinks of the identified hierarchical references of the first design that are functionally equivalent to the hierarchical references of the second design into targets for an equivalence check; and program instructions to connect common sources of the identified hierarchical references to random values within a domain of the first and second designs; and program instructions to determine whether the measured value outputs of the first design match the value outputs of the second design.

14. The computer system of claim 13, wherein the program instructions to determine whether the measured value outputs of the first design match the value outputs of the second design comprise:

program instructions to execute an equivalence check, wherein the equivalence check compares the values at the targets of the first and second design while the common sources are connected to random values.

15. The computer system of claim 13, wherein the program instructions to identify hierarchical references of the first design that are functionally equivalent to hierarchical references of the second design is based at least in part on saved changes on a name mapping database.

16. The computer system of claim 13, wherein the program instructions to construct a netlist of the identified hierarchical references of the first design that are functionally equivalent to the hierarchical references of the second design comprise:

program instructions to identify common sources and common sinks of the first design and the second design; and program instructions to identify hierarchical references of the common sink and expanding logic feeding into common sinks for each of the first and the second design.

17. The computer system of claim 13, wherein the program instructions stored on the one or more computer readable storage media further comprise:

program instructions to generate a trace based on the executed equivalence check, wherein the trace lists values measured at the targets for a corresponding random value driven at a common source.

* * * * *